(12) United States Patent
Queen

(10) Patent No.: US 9,953,612 B2
(45) Date of Patent: *Apr. 24, 2018

(54) SYSTEMS AND METHODS FOR FACILITATING COMMUNICATION BETWEEN MOBILE DEVICES AND DISPLAY DEVICES

(71) Applicant: Samsung Electronics Co., Ltd., Suwon-si, Gyeonggi-do (KR)

(72) Inventor: Alan Queen, Smyrna, GA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

This patent is subject to a terminal disclaimer.

(21) Appl. No.: 14/498,142

(22) Filed: Sep. 26, 2014

(65) Prior Publication Data

US 2015/0009099 A1    Jan. 8, 2015

Related U.S. Application Data

(63) Continuation of application No. 13/467,979, filed on May 9, 2012, now Pat. No. 8,856,355.

(60) Provisional application No. 61/484,111, filed on May 9, 2011.

(51) Int. Cl.
| | | |
|---|---|---|
| *G06F 15/16* | (2006.01) | |
| *G09G 5/00* | (2006.01) | |
| *H04L 12/28* | (2006.01) | |
| *G06F 3/14* | (2006.01) | |

(52) U.S. Cl.
CPC ............... *G09G 5/006* (2013.01); *G06F 3/14* (2013.01); *H04L 12/282* (2013.01); *H04L 12/2814* (2013.01)

(58) Field of Classification Search
CPC ... H04L 65/1069; H04L 67/14; H04L 67/141; H04L 29/06319; H04L 29/08576; H04L 65/1066; H04W 76/023
See application file for complete search history.

(56) References Cited

U.S. PATENT DOCUMENTS

| | | | |
|---|---|---|---|
| 7,580,005 | B1 | 8/2009 | Palin |
| 8,208,906 | B2 | 6/2012 | Farris et al. |
| 8,645,574 | B2 | 2/2014 | Kaila et al. |
| 8,856,355 | B2 * | 10/2014 | Queen ................ H04L 12/2814 345/2.1 |

(Continued)

*Primary Examiner* — Oanh Duong
(74) *Attorney, Agent, or Firm* — Jefferson IP Law, LLP

(57) ABSTRACT

Certain embodiments herein may include systems and methods for facilitating communication between mobile devices and display devices. According to certain embodiments, various types of connections may be established for communication between mobile devices and display devices. The type of connection may be based on numerous factors, including networks accessible to the mobile devices and display devices, capabilities of the mobile devices and display devices, and requirements associated with a software application running on a display device or on a device associated with the display device. Example connection types may involve a server intermediary which may establish a communication connection and proxy or relay content between mobile devices and display devices. Other connection types may not involve a server intermediary, for example, when a mobile device interacts with a display device to control a real-time game application.

18 Claims, 4 Drawing Sheets

(56) References Cited

U.S. PATENT DOCUMENTS

| | | | |
|---|---|---|---|
| 2002/0049507 A1 | 4/2002 | Hameen-Anttila | |
| 2005/0266879 A1* | 12/2005 | Spaur | H04L 12/4625 |
| | | | 455/556.2 |
| 2006/0109240 A1* | 5/2006 | Fu | G06F 3/14 |
| | | | 345/156 |
| 2007/0263613 A1* | 11/2007 | Hara | H04L 12/66 |
| | | | 370/356 |
| 2008/0039063 A1 | 2/2008 | Ichieda | |
| 2008/0102808 A1* | 5/2008 | Jachner | H04M 3/56 |
| | | | 455/420 |
| 2010/0216508 A1 | 8/2010 | Ma et al. | |
| 2011/0070879 A1 | 3/2011 | Walter et al. | |
| 2011/0106954 A1 | 5/2011 | Chatterjee et al. | |
| 2011/0167444 A1* | 7/2011 | Sun | H04N 7/17318 |
| | | | 725/31 |
| 2011/0246904 A1* | 10/2011 | Pinto | G06F 9/4445 |
| | | | 715/740 |
| 2011/0275391 A1 | 11/2011 | Lee et al. | |
| 2012/0040720 A1 | 2/2012 | Zhang et al. | |
| 2012/0066722 A1 | 3/2012 | Cheung et al. | |
| 2012/0079080 A1* | 3/2012 | Pishevar | A63F 13/12 |
| | | | 709/220 |
| 2012/0140676 A1 | 6/2012 | Kim et al. | |
| 2012/0166553 A1 | 6/2012 | Rubinstein et al. | |
| 2012/0172088 A1 | 7/2012 | Kirch et al. | |
| 2013/0109310 A1 | 5/2013 | Mine et al. | |

\* cited by examiner

SYSTEMS AND METHODS FOR FACILITATING COMMUNICATION BETWEEN MOBILE DEVICES AND DISPLAY DEVICES

RELATED APPLICATIONS

This is a continuation application of prior U.S. patent application Ser. No. 13/467,979, filed on May 9, 2012 which claims the benefit under 35 U.S.C. § 119(e) of a U.S. Provisional Application filed on May 9, 2011 in the U.S. Patent and Trademark Office and assigned Ser. No. 61/484,111, the entire disclosure of which is hereby incorporated by reference.

TECHNICAL FIELD

Embodiments herein relate generally to computer networking and, more particularly, to establishing various types of network connections to facilitate communication between mobile devices and display devices.

BACKGROUND

Display devices, such as smart televisions, are increasingly providing software applications that allow users to interact with smart display devices. Such applications may include real-time games, turn-based games, or applications that allow a user to share and/or modify content such as images, text, audio, or multimedia, etc., as well as other applications that may be found in a typical computing device including a processor, a memory, and a user interface. While increasingly providing such functionality, users are limited in the manner that they interact with display devices, such as via controllers or other devices. For example, controllers that accompany a smart device may be limited to selecting standard content presented by a display device via one or more hard buttons on the controllers. Thus, the extent to which a user may interact with a display device may be limited by existing controllers. Additionally, many display devices may not be equipped to handle incoming connections from other devices, and therefore these display devices may be unable to establish direct, real-time communications with other devices. As a result of this inadequacy, such display devices may have to rely on more latent communications with other devices, which may be insufficient for communicating some types of content.

SUMMARY

Some or all of the above needs and/or problems may be addressed by certain embodiments of the invention. Certain embodiments may include systems and methods for facilitating communication between mobile devices and display devices. According to one embodiment, there is disclosed a system including at least one memory storing computer-executable instructions and at least one processor. The at least one processor is configured to execute the computer-executable instructions to receive, from a display device of the plurality of devices, first information identifying the display device; receive, from a mobile device of the plurality of devices, second information identifying the mobile device and at least a portion of the first information; determine a type of connection between the mobile device and the display device based at least in part on at least one of the first information or the second information; and establish the type of connection between the mobile device and the display device.

According to another embodiment, there is disclosed one or more computer-readable media storing computer-executable instructions that, when executed by at least one processor, configure the at least one processor to perform certain operations. The operations may include receiving, at a mobile device, a first input identifying a display device and a second input identifying an application running on the display device; connecting to the control server device, wherein the connecting comprises sending, to the control server device, information identifying the mobile device; sending the first input and the second input to a control server device; receiving, from a display device, a connection request; disconnecting from the control server device; and sending, from the mobile device, content to the display device.

According to a further embodiment, there is disclosed a method for receiving, from a display device, first information identifying the display device; receiving, from a mobile device, second information identifying the mobile device and at least a portion of the first information; determining a type of connection between the mobile device and the display device based at least in part on at least one of the first information or the second information; and establishing the type of connection between the mobile device and the display device.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
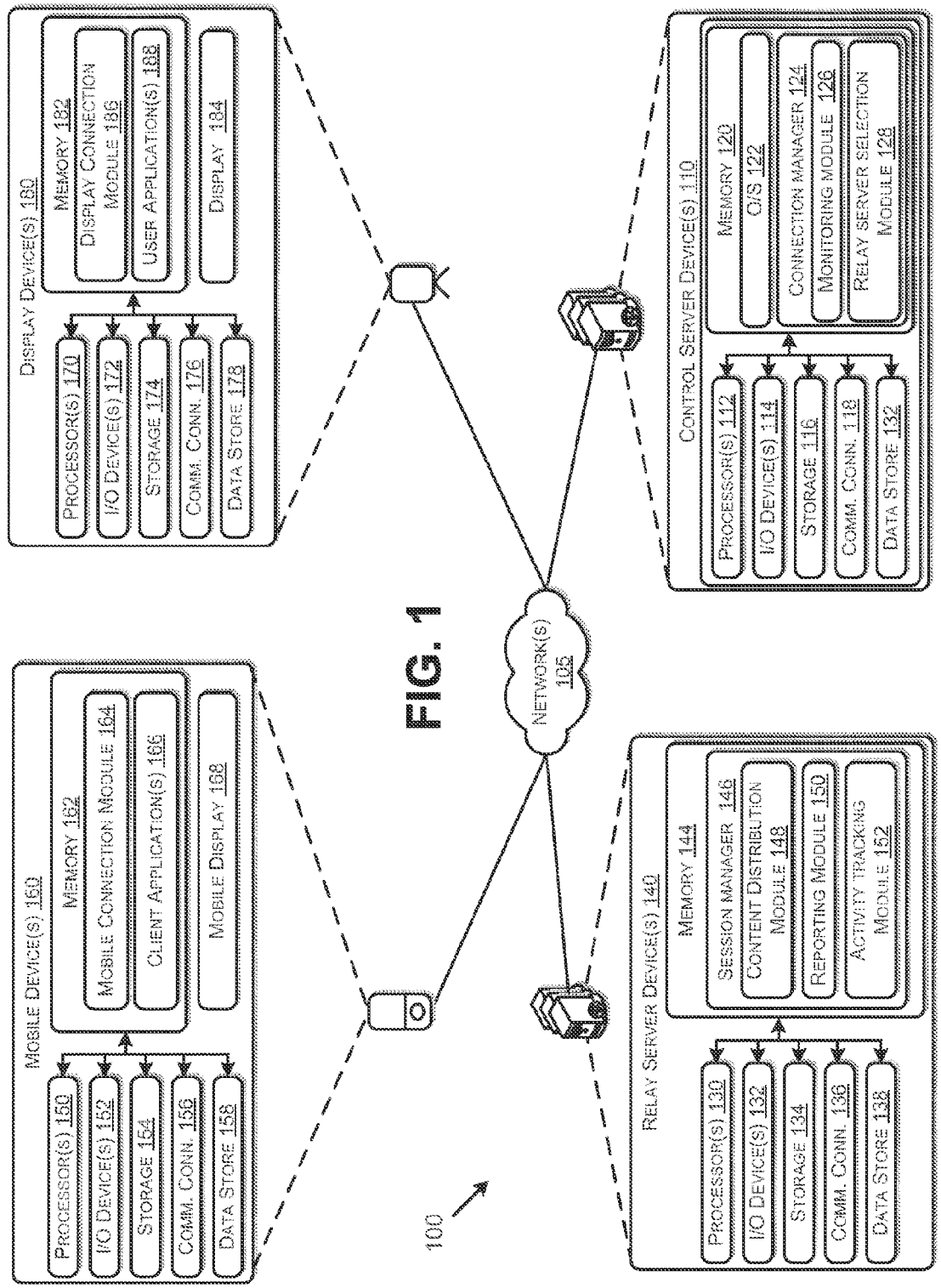
FIG. 1 illustrates a computing environment for facilitating communication between mobile devices and display devices, according to an embodiment of the disclosure.

Certain implementations will now be described more fully below with reference to the accompanying drawings, in which various implementations and/or aspects are shown. Various aspects may, however, be implemented in many different forms and should not be construed as limited to the implementations set forth herein. Like numbers refer to like elements throughout.

DETAILED DESCRIPTION

Illustrative embodiments herein are directed to, among other things, systems and methods for facilitating communication between mobile devices and display devices. A mobile device, such as a smart phone, may modify or interact with content on a display device, such as a television. For example, by virtue of establishing a connection between the mobile device and the display device, an image as shown on a display device may also be viewed on the mobile device. A user may modify the content on the mobile device, which may in turn cause the modified content to be displayed on the display device. A mobile device, in some embodiments, may push content (or a representation or indication thereof), such as images, photos, or text, to a display device. Other users also may use a mobile device to view and/or interact with the same content and/or push other content to the display device for viewing and/or interaction by other users. In this way, a mobile device may act as a controller of content on a display device. A connection between a mobile device and a display device may first be required before such communication may occur, in certain embodiments. Such a connection may be based on various factors related to the capabilities of the mobile device and the capabilities of the display device, networks to which the devices have access, and/or a software application that may be used to enable the communication between and/or content exchange between the mobile device and the display device, as non-limiting examples. Certain embodiments herein are directed to establishing at least three types of connections, including a cloud connection, a direct connection, or a location-based connection, each of which is discussed in greater detail below.

With any of the above connection types, communication between the devices may require that the devices be uniquely identified on a network so that devices may identify and communicate with one another. Such identification may be established by a control server device, in one embodiment, which may mediate the connection process between mobile devices and display devices. The control server device may also determine the type of connection to be used between the devices, based at least in part on various criteria. For example, a cloud connection may be preferred for communication between devices on separate networks or for which real-time interaction may not be critical. With a cloud connection, the control server device may proxy or relay content between mobile devices and display devices. For example, as a mobile device interacts with a software application on a display device, content associated with the interaction may be sent from the mobile device to a server in the cloud. The one or more servers may send the content to the display device, where the users may view and/or interact with the content.

Similar to a cloud connection, the servers in a cloud may relay content between mobile devices and display devices in association with a location-based connection, in which mobile devices and display devices provide their geographical coordinates. The cloud servers may calculate the proximity of display devices with respect to a mobile device requesting an application (that is, access to said application) on a display device and connect the mobile device to a display device local or proximate to the mobile device. For example, in a building with multiple displays, a user may be connected to the display device closest to the mobile device, though other factors such as load balancing (e.g., number of users) or signal strength, also may be considered in addition to device proximity in selecting a display device to which the user may be connected.

Unlike the cloud connection or location-based connection, a direct connection may not involve one or more servers in a cloud relaying content between mobile devices and display devices. Such communication may occur directly between a mobile device and a display device. A direct connection may be preferred when the mobile device and the display device are on the same network, e.g., the same WiFi network, as may be determined by a control server device. In one embodiment, a mobile device may host a direct connection with a display device, while the display device may host the connection in another embodiment.

Each of the cloud connection, the direct connection, and the location-based connection will be discussed in greater detail below in association with the accompanying figures. The above connection examples are non-limiting. Many more types of connections involving different types of networks, computing devices, and criteria and/or techniques for connecting mobile devices and display devices may exist in other embodiments.

FIG. 1 depicts an example computing environment 100 for facilitating communication between mobile devices and display devices, according to an embodiment of the disclosure. The computing environment 100 may include, but is not limited to, one or more control server devices 110, one or more relay server devices 140, one or more mobile devices 160, and one or more display devices 180. Each of these devices may communicate with one another via one or more networks 105 to facilitate communication between mobile devices 160 and display devices 180. For example, a mobile device 160 and a display device 180 may communicate with a control server device 110 to provide information that may identify both devices to the control server device 110. A control server device 110 may communicate with multiple relay server devices 140 to select one or more of the relay server devices 140 for transferring or relaying content between a mobile device 160 and a display device 180.

As used herein, the term "device" may refer to any computing component that includes one or more processors that can be configured to execute computer-readable, computer-implemented, or computer-executable instructions. Examples of these types of devices may include smart phones, personal digital assistants, digital tablets, digital assistants, Internet appliances, personal computers, server computers, Web servers, server farms, application-specific circuits, microcontrollers, minicomputers, transceivers, customer premise equipment such as set-top boxes, kiosks, or other processor-based devices. The execution of suitable computer-implemented instructions by one or more processors associated with various devices may form special purpose computers or other particular machines that may facilitate communication between mobile devices and display devices as described herein.

As used herein, the term "mobile device" may refer to a portable device that may include a processor, a memory, and a display for enabling a user to interact with software applications running on, or in association with, other devices, such as display devices. Example mobile devices may include, but are not limited to, smart phones, other telephones with wireless communication capability, personal digital assistants (PDAs), eBook readers, personal computers (PCs), including laptop PCs and tablet PCs, or any other computing device (wired or wireless) with network access for communicating over a private or public network, such as the Internet, WiFi, Bluetooth, or a LAN.

The term "display device" as used herein may refer generally to an output device for presentation of information. Such information may be received from or based on interaction with a mobile device or other device as defined herein. Example display devices may include, but are not limited to, televisions, computer monitors (e.g., connected to a desktop or laptop computer), mobile phone display devices, tablets, projection-based displays, JumboTrons, or any other device for displaying images and/or video.

As used herein, the term "connection host" may refer to any device that may accept incoming requests for persistent connections. Such connection hosts may include a control server device, which may receive such requests from display devices and/or mobile devices. A mobile device may also act as a connection host for receiving incoming connection requests from display devices. As an example, a display device, such as a smart television, may not act to serve as a connection host but may instead rely on a mobile device (e.g., in a direct connection) or a control server device (e.g., in a cloud connection) to provide such a persistent connection. As another example, an application running inside a Web browser may not be able to function as a connection host because the application's security restrictions may prevent it from accepting incoming connections. An installed application, on the other hand, is typically given permission to accept incoming connections and can therefore function as a connection host. In most instances, the control server may be able to function as a connection host since it may be a server application running in the cloud. In some embodiments, a display device may serve as a connection host, and receive incoming connection requests from mobile devices.

The one or more networks 105 may include any number of wired or wireless networks that can enable various computing devices in the example computing environment 100 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another, e.g., the control server devices 110 may be directly connected to the relay server devices 140.

The devices illustrated in FIG. 1 may include one or more processors configured to communicate with one or more memory devices and various other components or devices. For example, the control server device 110 may include one or more processors 112 that are configured to communicate with one or more memory devices 120, one or more input/output (10) devices 114, storage 116, one or more communication connections 118, and the data store 132. The processor 112 may be implemented as appropriate in hardware, software, firmware, or combinations thereof. Software or firmware implementations of the processor 112 may include computer-executable or machine-executable instructions written in any suitable programming language to perform the various functions described herein. Processor 130 associated with relay server device 140, processor 150 associated with mobile device 160, and processor 170 associated with display device 180 may be the same or at least similar to the processor 112, in one embodiment.

The memory 120 may store program instructions that are loadable and executable on the processor 112, as well as data generated during the execution of these programs. Depending on the configuration and type of control server device 110, the memory 120 may be volatile, such as random access memory (RAM), and/or non-volatile, such as read-only memory (ROM), flash memory, etc. The memory 144 associated with the relay server device 140, the memory 162 associated with the mobile device 160, and the memory 182 associated with the display device 180 may be the same or at least similar to the memory 120, in one embodiment.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 120 may include multiple different types of memory, such as static random access memory (SRAM), dynamic random access memory (DRAM), or ROM. The storage 134 associated with a relay server device 140, the storage 154 associated with the mobile device 160, and the storage 174 associated with the display device 180 may provide the same or similar functionality to the storage 116, in one embodiment.

The memory 120 and the storage 116, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 118 may allow the control server devices 110, the display devices 180, and the mobile devices 160 to communicate with other devices, e.g., relay server devices 140, databases, external memory devices, user terminals, and various other devices that may exist on the one or more networks 105. The I/O devices 114 may enable a user to interact with the control server device 110. Such I/O devices 114 may include, but are not limited to, a keyboard, a mouse, a pen, a voice input device, a touch input device, a display, a camera or imaging device, speakers, or a printer. The communication connections 136 associated with the relay server device 140, the communication connections 156 associated with the mobile device 160, and the communication connections 176 associated with the display device 180 may provide the same or at least similar functionality to the communication connections 118, in one embodiment.

The one or more data stores 132 may store lists, arrays, databases, flat files, etc. The data stores 132 may store information associated with connection options, device capabilities, connection requirements, device identifiers, and/or other information that may facilitate implementation of the processes described herein. Connection options may include a collection of device capabilities and connection requests that may be used to determine appropriate or optimal connection methods for a device by the control server. Device capabilities may include information about a device including, but not limited to, how it may connect to the Internet (wired and/or wirelessly), whether it can function as a connection host, and whether its location (e.g., based on geographical coordinates) is known or can be determined by the device. In some aspects, this information may be used by a control server device in determining appropriate or requested connection methods for a device. Connection requirements may indicate whether a software application running on a display device may require a direct connection to another device over the same network, or if it is allowed to relay messages to connected devices via the connection host. For instance, in many cases, an application running inside a web browser may not accurately determine its location, but a mobile device that has a built-in global positioning service (GPS) chip may be able to determine its location more accurately. Additionally and/or alternatively, a display device that may not determine its location may be configured to receive an assigned location (e.g., from a system administrator) which may be used by mobile devices to locate a display device near it. The data store 138 associated with the relay server device 140, the data store 158 associated with the mobile device 160, and the data store 178 associated with the display device 180 may be the same or at least similar to the data store 132, in one embodiment.

The relay server device 140, the mobile device 160, and the display device 180 may include some or all of the devices or components described above in association with the control server device 110, several of which are discussed below.

The memory 120 of the control server device 110 may also include an operating system 122 and various software applications and/or modules that may implement the facilitation of communication between display devices and mobile devices. Example modules may include a monitoring module 126 and a relay server selection module 128. Each of these modules may be implemented as individual modules within the connection manager 124 that may provide specific functionality associated with facilitating communication between devices. Alternatively, one or more of the modules may perform all or at least some of the functionality associated with the other modules. In one embodiment, the monitoring module 126 and the relay server selection module 128 may be part of an application programming interface (API) that may be installed on the control server device 110.

The connection manager 124 may manage connections between mobile devices 160 and display devices 180. Such management may include authenticating users (e.g., via a login and password) requesting access to content on a display device 180 via a mobile device 160. Such management may also include establishing a connection between mobile devices 160 and display devices 180. As an example, the connection manager 124 may establish such a connection by disseminating information between devices so that the devices may know how to contact and communicate with other devices. The disseminated information may include access codes that uniquely identify individual display devices 180. The access codes may be generated by the connection manager 124 and sent to display devices 180 and mobile devices 160 requesting access to display devices 180. Management by the connection manager 124 may also include determining an appropriate connection type between mobile devices 160 and display devices 180, (e.g., cloud connection, direct connection, or location-based connection) and tracking a user's interactions with a software application. The connection manager 124 may perform numerous other functions in other embodiments.

The monitoring module 126 may monitor or listen for incoming connection requests from devices, such as mobile devices 160 and display devices 180. The monitoring module 126 may receive various identifying information associated with connection requests, such as, but not limited to, an Internet Protocol (IP) address associated with a device, a geographical location of the device (e.g., longitude and latitude coordinates), hardware and software capabilities of the device, requirements for a software application associated with the device, an access code uniquely identifying a display device 180, or other information that may facilitate communication between mobile devices 160 and display devices 180 as described herein. The monitoring module 126 may store such information (e.g., in storage 116, memory 120, data store 132, or an external storage device, as non-limiting examples) for access by the connection manager 124, which, as described above, may analyze the information to perform various functions to facilitate communication between mobile devices 160 and display devices 180.

The relay server selection module 128 may select one or more relay server devices 140 for relaying content between mobile devices 160 and display devices 180. The one or more relay server devices 140 may be selected based on a number of factors including, but not limited to, load (e.g., number of concurrent users), or operational performance of the relay servers. For example, a relay server device 140 having fewer concurrent users than other relay servers may be selected. As another example, a relay server device 140 that may be experiencing operational issues, as may be identified from a number of dropped network packets associated with a communication connection 118 provided by a network interface (NIC) card, for example, may not be selected in favor of another relay server device 140 that may be associated with more reliable network communication. In addition, the relay server selection module 128 may select a different one or more relay server devices 140 after an initial one or more relay servers have been selected. This modified selection may also be based on changes to load and operational performance, or other information regarding the connection between the mobile devices 160 and the display devices 180.

A relay server device 140 may be configured to communicate with other devices on a network, e.g., a control server device 110, a mobile device 160, and a display device 180. The relay server device 140 may include a memory 144, which may include various software applications and/or modules. Example modules in the memory 144 may include a content distribution module 148, a reporting module 150, and an activity tracking module 152. Each of these modules may be implemented as individual modules within the session manager 146 that may provide specific functionality associated with distributing content between mobile devices 160 and display devices 180. Alternatively, one or more of the modules may perform all or at least some of the functionality associated with the other modules. In one embodiment, the content distribution module 148, the reporting module 150, and the activity tracking module 152 may be part of an API that may be installed on the relay server device 140.

The session manager 146 may manage the distribution of content between mobile devices 160 and display devices 180. Such management may include receiving requests, e.g., from the connection manager 124, to distribute content between mobile devices 160 and display devices 180. The request may include a specified mobile device 160 and display device 180 between which the content may be sent, as well as an application identifier identifying an application running on the specified display device 180 that may be accessed by the specified mobile device 160. The mobile device 160 and the display device 180 may be uniquely identified by an IP address or geographic location, as examples, which the session manager 146 may use to distribute the content between the devices. The session manager 146 may also allocate memory for storing and tracking content distributed between mobile devices 160 and display devices 180. For example, as a user interacts with a software application, the content associated with the interaction may be stored in memory allocated for the software application and subsequently tracked, e.g., via the activity tracking module 152.

The content distribution module 148 may distribute or relay content between mobile devices 160 and display devices 180. For example, the content distribution module 148 may receive content from a mobile device 160 and send the content to a display device 180, or vice versa. The content distribution module 148 may rely upon various protocols to relay information between devices. Such protocols may include, but are not limited to, Transmission Control Protocol/Internet Protocol (TCP/IP) socket (e.g., for client-server based applications), Hypertext Transfer Protocol (HTTP) (e.g., for web-based communications), and Unix-to-Unix Copy (UUCP), File Transfer Protocol (FTP), or another protocol to relay content between devices. In one embodiment, multiple protocols may be used when, for example, one or more protocols are not working properly. For example, if an attempt to transfer content failed using TCP/IP, FTP may be used to relay the content instead. The content distribution module 148 may monitor such failures and select a different protocol in response to detecting a failure. A corresponding application may exist on a destination device (whether it be the mobile device 160 or the display device 180) to receive content sent via various protocols, and display the content on a screen for the destination device.

The reporting module 150 may collect various information regarding communication between mobile devices 160 and display devices 180 and send the information to the connection manager 124 where the information may be analyzed and used to select, for example, a relay server device 140 instead of the one currently being used. The collected information may include load balancing information, such as the number of concurrent users, and operational performance information that may indicate the communication reliability of a relay server device 140 (as described above), the processing capability of the relay server device 140, the amount of available memory or disk space for storing content, etc.

Many more configurations for the control server device 110 and relay server device 140 may exist in other embodiments. In one configuration, a single device with one or more modules may perform the functions described herein with respect to the control server device 110 and the relay server device 140.

A mobile device 160 may be used to view and/or interact with content on a display device 180. Example mobile devices may include, but are not limited to, smart phones, other telephones with wireless communication capability, personal digital assistants (PDAs), eBook readers, personal computers (PCs), including laptop PCs and tablet PCs, or any other computing device (wired or wireless) with network access for communicating over a private or public network, such as the Internet, WiFi, Bluetooth, or a LAN. A mobile device 160 may include various software applications and/or modules in a memory 162 that may enable such viewing and/or interaction. For example, a mobile connection module 164 may enable a mobile device 160 to send connection requests to other devices, e.g., the control server device 110. In conjunction with sending a connection request, a mobile device 160 may connect to a control server device 110 and receive information that may be used to connect to a display device 180. The mobile device 160 may also receive connection requests from other devices. For example, the mobile device 160 may receive an incoming connection request from a display device 180, e.g., as part of establishing a direct connection, which will be discussed in greater detail below.

The memory 162 may also include one or more client applications 166, which may be used to view and/or interact with content on a display device 180, for example. In one embodiment, the one or more client applications 166 may include a web browser that may communicate with a web server, e.g., on the control server device 110 and/or the relay server device 140, to receive content from a display device 180. According to this embodiment, the browser may include web-based code that may generate a web page (in mobile display 168) including content received from a web server and user controls that may enable a user to interact with the content. In another embodiment, the one or more client applications 166 may include various applications, each of which may provide specific functionality for communicating with a corresponding server application on a display device 180. For example, the one or more client applications 166 may perform client-side functions in a client-server environment to, for example, access mobile device information such as, but not limited to, accelerometer data, ambient light data, image sensor data, audio data, or global positioning system (GPS) data that may be used to determine a geographical location of a mobile device 160. The one or more client applications 166 may send such information to a server-side application, where it may be processed (e.g., filtered and/or formatted) for display at a display device 180. The one or more client applications 166 may also filter and/or format content that is received and displayed at a mobile device 160. The one or more client applications 166 may also provide at least one authentication module or interface that may authenticate a user's access to content.

A display device 180 may be used for presenting content (e.g., via display 184) for viewing and/or interaction with devices, such as mobile devices 160. Examples of the display device 180 may include, but are not limited to, televisions, computer monitors (e.g., connected to a desktop or laptop computer), mobile phone display devices, tablets, projection-based displays, JumboTrons, or any other device for displaying images and/or video. The display device 180 may include a memory 182, which may include a display connection module 186 and one or more user applications 188. The display connection module 186 may enable the display device 180 to send and receive connection requests to and from other devices. In one example, the display connection module 186 may send a connection request to a mobile connection module 164 to establish a connection (e.g., a direct connection) with a mobile device 160. According to this example, the display device 180 may be unable to receive incoming connections and may therefore rely on a mobile device 160, e.g., via the mobile connection module 164, to establish a connection (e.g., a direct connection with a mobile device) for the display device 180.

The memory 182 may also include one or more user applications 188. A processor associated with the display device 180 may execute computer-executable instructions associated with the one or more user applications 188 to render content associated with the user applications 188 on the display device 180, where users may view and/or interact with the content via a mobile device 160. Various types of applications, such as real-time games, turn-based games, or generally any application that may involve the rendering of content on a display device may exist on the display device 180, such as a smart television. In some embodiments, the one or more user applications 188 may exist on a console device or other device (not shown) that may have a connection to one or more display devices 180, which may be dumb terminals. The console device may have a connection to multiple display devices such that when one or more processors associated with the console device execute computer-executable instructions associated with the one or more user applications 188, content associated with the user applications 188 may be rendered on each of the display devices to which the console is connected.

The one or more user applications 188 may each have an application identifier that may uniquely identify the user applications. In one embodiment, a user desiring to interact with a particular software application may enter an application identifier associated with the particular software application into a mobile device 160, which may in turn send the application identifier to a server, e.g., the control server device 110.

The control server device 110, e.g., via the connection manager 124, may perform several functions upon receiving the application identifier. For example, the control server device 110 may use the application identifier to track, among other things, a user's interaction with content associated with a corresponding software application, e.g., via the activity tracking module 152. The control server device 110 may also send a command including the application identifier to a display device 180, or a device associated with the display device 180 (e.g., a console device as described above), on which the software application may run, to instruct the display device 180 or associated device to initiate or launch the software application corresponding to the application identifier. In one embodiment, the connection manager 124 associated with the control server device 110 may send the command to the display connection module 186 associated with the display device 180 to launch one or more user applications 188. Once a user application 188 is launched, according to one embodiment, a mobile device 160 may interact with the user application to send and receive content to and from the display device 180. Example applications and interaction with these applications via a mobile device 160 are described in FIG. 2.

Figure 2:
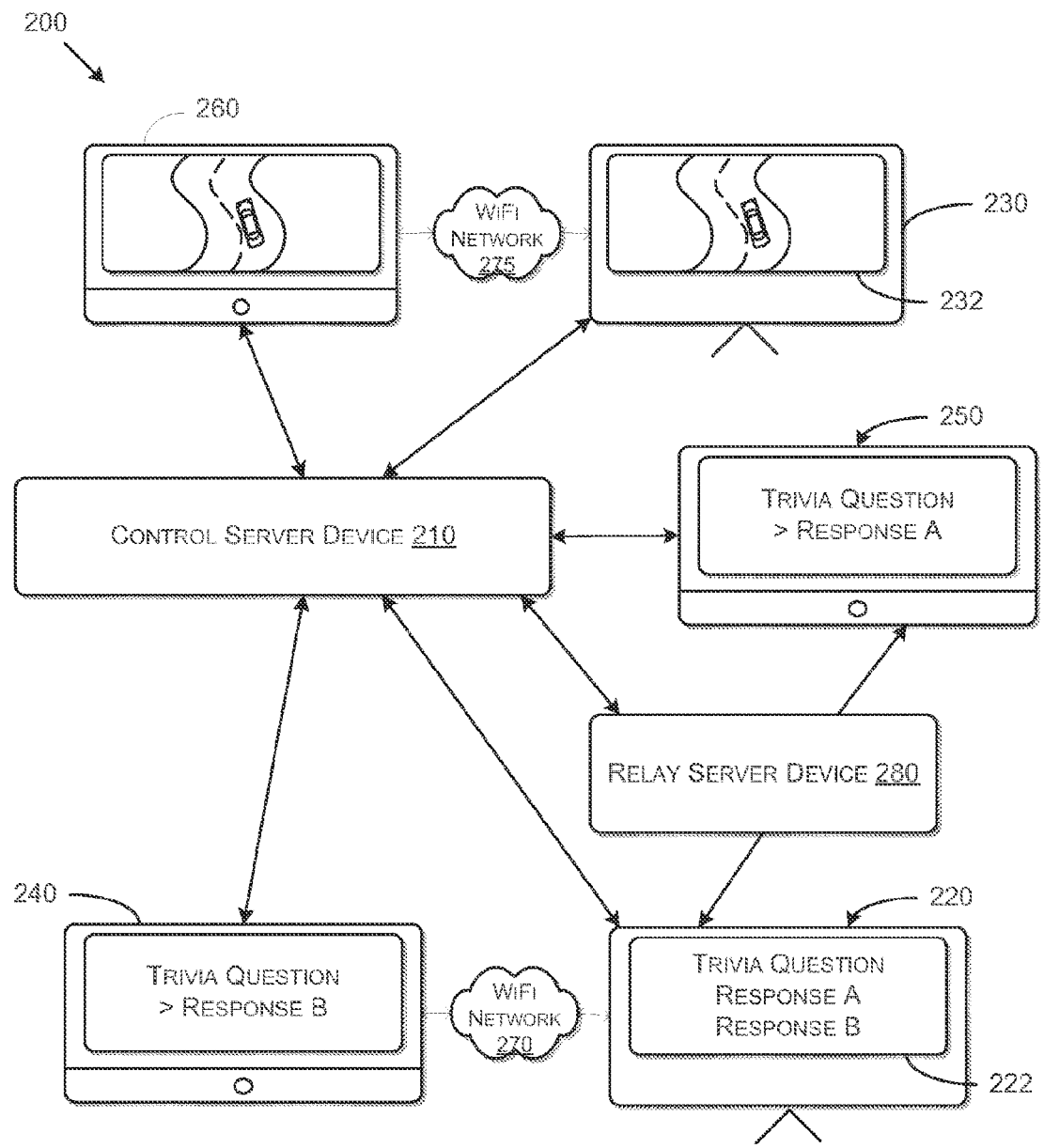
FIG. 2 illustrates a schematic diagram of various types of communication scenarios between mobile devices and display devices, according to an embodiment of the disclosure.

FIG. 2 is a schematic diagram illustrating various types of communication and content sharing scenarios between mobile devices and display devices on a network, according to an embodiment of the disclosure. As noted, such types of communication may include a cloud connection, a direct connection, or a location-based connection, as non-limiting examples. Various factors may be used, e.g., by the connection manager 124, to determine which type of connection may be used between a mobile device and a display device. For example, a software developer of an application running on a display device, or in association with a display device (e.g., via a console device), may define the connection type in the application or as part of configuration requirements used by the application. A server, e.g., control server device 110, may also determine an optimal connection for the communication. A determination of the connection type may be based at least in part on the network to which devices are connected, the software applications utilized by the mobile device and/or the display device, and the capabilities of the devices for which the connection may be established, as non-limiting examples. For example, a direct connection may be selected for mobile devices and display devices that are on the same network, e.g., the same WiFi network. In this case, content may be sent directly to and from the mobile devices and the display devices without involvement from a server intermediary, e.g., the control server device 110 or the relay server device 140. A direct connection may also be selected for a real-time game in which a mobile device 160 uses accelerometer data to control a character or element on the display. In operating such a game, a minimal amount of latency may be critical. A cloud connection, however, may be selected for a "turn-based" game, or a game in which users take turns playing, because minimal latency may not be critical.

In the example embodiment in FIG. 2, multiple mobile devices 240, 250, and 260 may communicate with multiple display devices 220 and 230. As described above, the mobile device 260 may effectively launch a user application on, or in association with, the display device 230 (e.g., a real-time game 232) and on, or in association with, the display device 220 (e.g., a trivia game 222) by in part sending an application identifier associated with the real-time game 232 and trivia game 222 to a server such as the control server device 210. The control server device 210 may in turn, via the connection manager 124 in FIG. 1, send a command including the application identifier to the display device 180, which may include one or more processors that may execute computer-executable instructions for the application associated with the user application identifier to launch or start the user application. When the trivia game 222 and real-time game 232 are launched, content associated with those applications may be displayed on a display screen associated with a device on which the user applications may be running, in one embodiment. The mobile device 260 (or additionally/alternatively the mobile devices 240 and 250) may thereafter interact with such content by receiving and manipulating the content. Such manipulations or interactions may be performed via the one or more client applications 166 (shown in FIG. 1) associated with the mobile devices 240, 250, and 260. As the interactions are performed to modify the content, the mobile device 240 may send the modified content, e.g., via a client application 166, to the display devices 220 and 230. As an example, as a user moves an object (e.g., a car) on the display for the mobile device 260, the object may adjust accordingly on the screen of the display device 230 by virtue of communication between a client application 166 and a user application 188 as described above. Such communication may occur via a direct connection via WiFi network 275 shown in FIG. 2. As another example, the mobile devices 240 and 250 may interact with a trivia game on the display device 220. As users enter responses on their associated mobile devices 240 or 250, the entered responses may be displayed on the screen of the display device 220, as illustrated in FIG. 2. The control server device 210 may facilitate the communication between the mobile devices and display devices shown in FIG. 2. The facilitation may include establishing the connection and, in some embodiments, proxying content between mobile devices and display devices, which may be provided by a relay server device 280.

Establishing a connection may include configuring the devices on a network, e.g., mobile devices 240, 250, and 260 and display devices 220 and 230, so that the devices may identify and communicate with other devices on the network. In one embodiment, such configuration may be performed by the connection manager 124 of the control server device 210. As part of the configuration, devices may register with the control server device 210 so that the devices may identify other devices available for communication. Such registration may include the mobile devices or display devices providing information that may uniquely identify them. Such information may include, but is not limited to, an IP address, a geographical location including longitude and latitude coordinates, a Media Access Control (MAC) address associated with a network interface card installed in a device, or other unique identification. Additional information may also be provided to the control server device 210, such as the manufacturer of the device, a network carrier, memory and hard disk capacity, processor speeds, an application identifier associated with user applications 188 running on a device, or other information that may assist the control server device 210 in determining which type of connection (e.g., cloud connection, direct connection, or location-based connection) to establish for the device. The received information may be stored, e.g., at the control server device 210 or some other device having sufficient storage capacity and accessible by one or more processors (not shown) in the control server device 210.

Establishing a connection may also include the control server device 210 generating and sending an access code to the display devices 220 and 230, where the access code may be visible to users desiring to interact with the display devices 220 and 230 via the mobile devices 240, 250, and 260. These functions may be performed by the connection manager 124 of the control server device 210, in one embodiment. The access code may be generated according to various methods or techniques to ensure that it is unique for each of the display devices 220 and 230. Non-limiting examples of such techniques may include incrementing a numerical access code with respect to the last known access code, or deriving the access code based at least in part on an IP address or a geographical location received from the respective display devices 220 or 230. An access code may be stored and permanently assigned to each of the display devices 220 and 230, or may be regenerated each time one of the display devices 220 or 230 requests to host communication with mobile devices. In addition to sending the access code, the connection manager 124 of the control server device 210 may also provide connection information, such as IP address, memory capacity, processor speeds, etc., to a device requesting communication with another device for which the control server device 210 has such information. In some embodiments, in addition to or as an alternative to sending an access code to the display devices 220 and 230, the control server device 210 may broadcast an IP address for use by devices receiving such information. In this way, each device may also have a unique identifier that the devices may use to identify and communicate with other devices. In one embodiment, no matter which type of connection is implemented (e.g., cloud connection, direct connection, or location-based connection as will be discussed in greater detail below), the control server device 210 may be used to establish communication in the manner described above. In other embodiments, the control server device 210 may not be involved in establishing the connection.

Establishing a connection may further include the control server device 210 using the received information in part to determine which one of the one or more relay server devices 280 to select for relaying content between devices, e.g., via the connection manager 124 (not shown) of the control server device 210. As shown in FIG. 2, the relay server device 280 may be selected by the control server device 210 to relay content between the mobile device 250 and the display device 220, e.g., in a cloud connection. Although only one relay server device 280 is shown, many more may exist in other embodiments. A cloud connection may be used to facilitate communication between the mobile device 250 and the display device 220 because the content may not need to be communicated between the devices in real time, e.g., with minimal latency. In one embodiment, the control server device 210 and the relay server device 280 may be integrated into a single device. A determination of which relay server device 280 to select may be based at least in part on an application identifier, which may indicate hardware requirements for running a software application associated with the application identifier, the load or a number of concurrent sessions in use on the relay server devices 280, operational performance indicators of the relay server devices 280, etc. The selected relay server device 280 may be used to proxy or relay content between mobile devices and display devices, in some embodiments, such as those involving a cloud or location-based connection.

As a specific example, a user may use mobile device 250 to access the display device 220 to interact with the trivia game 222 displayed thereon. In one embodiment, such interaction may occur via a cloud connection, as may be determined by the control server device 210 as described above, or by a setting established by a software developer of the trivia game 222, as non-limiting examples. A cloud connection may include a number of servers running various instances in which various software applications and/or modules may run. In one example, servers in a cloud may include the control server device 210, which may be a head-end switch, or central device for receiving and processing communication between devices in a network. With a cloud connection, as a user manipulating the mobile device 250 enters a response (e.g., "Response A") to a trivia question displayed on the display device 220, the relay server device 280 may receive the response and relay it to the display device 220 so that the response may be shown on the screen of the display device 220, as illustrated in FIG. 2.

Additional users, such as a user of mobile device 240, may also participate in the trivia game 222 and submit a response (e.g., "Response B") to the trivia questions, also displayed on the screen of display device 220. The connection for the mobile device 240, however, may vary, in some embodiments, such that optimal connections are established for each mobile device based on the mobile device's capabilities and/or accessible networks, as non-limiting examples. In one example, the mobile device 240 may connect to the display device 222 via a direct connection because both devices are connected to the same WiFi network 270. The network 270 may be a Bluetooth or other network in other embodiments. By way of a direct connection, communications between the mobile device 240 and the display device 220 may occur directly, e.g., without proxying or relaying content between the devices by the control server device 210 or other server intermediary. For example, a direct connection between the mobile device 240 and the display device 220 may enable the mobile device 240 to send Response B directly to the display device 220.

Another mobile device, such as the mobile device 260, may also access the display device 220 and interact with the trivia game 222. Such interaction may occur, for example, via a location-based connection. According to a location-based connection, communication may occur between the mobile device 260 and the display device 220 based on a geographic location of the devices. In one example, longitude and latitude coordinates for the two devices 220 and 260 may be shared with the control server device 210. The control server device 210, via the connection manager (not shown), may calculate the proximity of the display devices within a predetermined distance of mobile device 260, and facilitate a connection between the mobile device 260 and the nearest display device providing, for example, a trivia game, in one embodiment. In another embodiment, the control server device 210 may present a list of available display devices, along with information identifying the location of the display devices and/or the content (e.g., application) on each for selection by a mobile device. A cloud computing arrangement, which may include a control server device 210, may be used to proxy content between the mobile device 260 and the display device 220 for a location-based connection. With a location-based connection, a geographical location may be used to identify a display device instead of an access code, according to one embodiment. An access code may be used in other embodiments when, for example, a display device may not know its geographical location.

Mobile devices may also communicate with other mobile devices, in certain embodiments. According to these embodiments, a mobile device may use a display device as a host for such communication. For example, the mobile device 250 may send content to the mobile device 240 via display device 220. According to this example, display device 220 may act as a host, e.g., receiving incoming content from mobile devices and forwarding the content to destination devices specified in the content, in one example. Also as shown in FIG. 2, the mobile device 260 may access the display device 230 to interact with a real-time game 232 that may require minimal latency between inputs into the mobile device 260 and subsequent updates on the display device 230. In certain embodiments, a direct connection as described above may be used to provide such communication.

The above examples are non-limiting. Many more examples may exist in other embodiments. For example, some examples may involve devices that are connected via one type of connection, either cloud connection, direct connection, or location-based connection. In other embodiments, a combination of any number of these types of connections may be used. Also, many other types of applications and different numbers of mobile devices, display devices, and control devices may exist in other embodiments.

Figure 3:
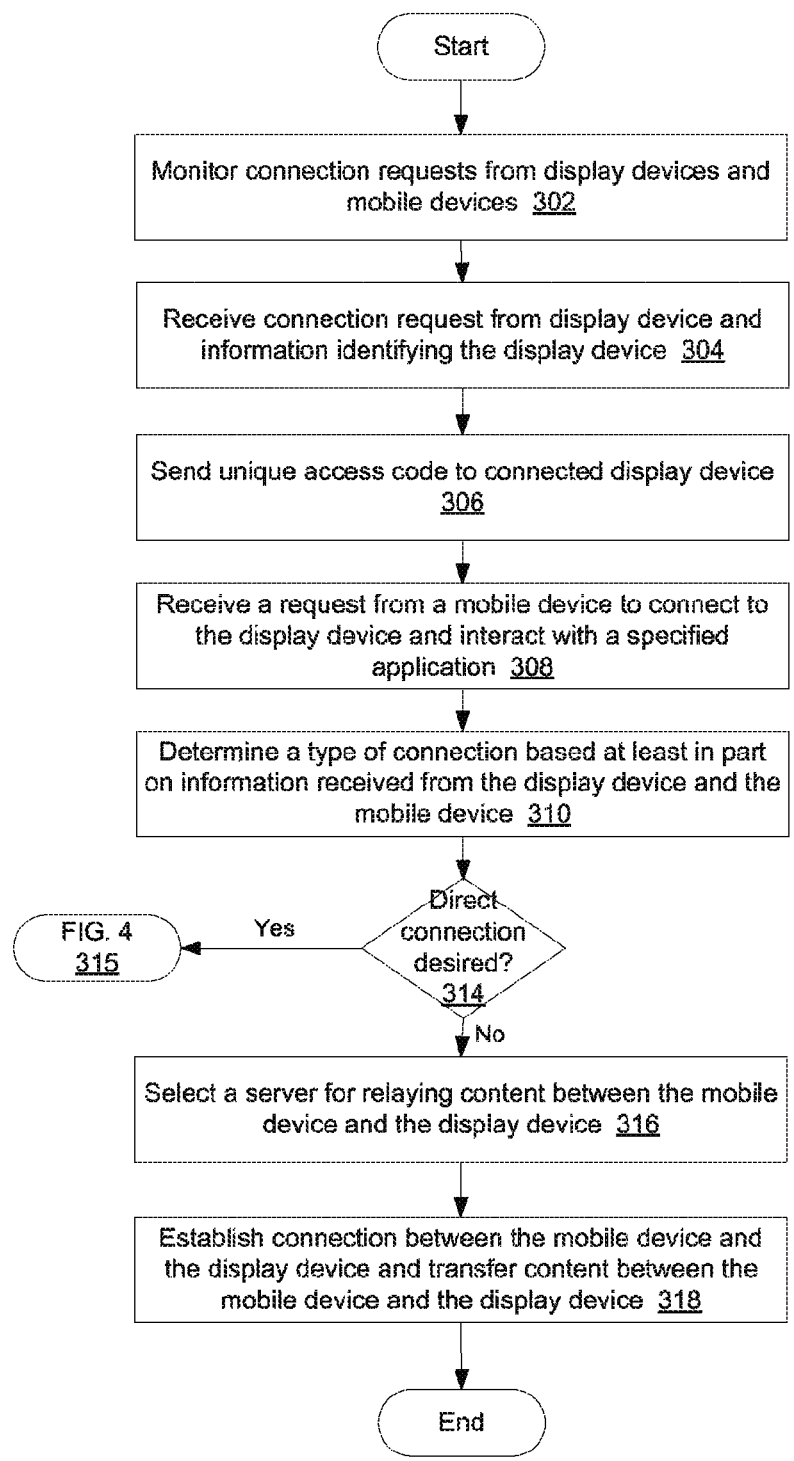
FIG. 3 illustrates an example flow diagram for facilitating communication between mobile devices and display devices, according to an embodiment of the disclosure.

FIG. 3 illustrates an example flow diagram 300 for establishing various types of connections between mobile devices and display devices, according to an embodiment of the disclosure. In an illustrative embodiment, the flow diagram 300 may be implemented by a control server device 110. The example flow diagram 300 may begin at block 302, where connection requests from devices, e.g., mobile devices 160 and display devices 180, may be monitored or listened for by a server such as a control server device 110. At block 304, a connection request from a display device and information identifying the display device may be received. As noted, the identifying information may include an IP address, geographic location information, or capabilities of the display device, as non-limiting examples. This information may be stored, e.g., via the connection manager 124, and used to generate an access code that may uniquely identify the display device on a network. A generated access code may be sent to the display device (at block 306), where it may be displayed. A user viewing the display device or otherwise receiving the access code may enter it into a mobile device. In some embodiments, an access code may not be sent to or be used to identify a display device. For example, if a location-based connection is desired, then geographical coordinates of the display device may be used instead of an access code to identify a display device, though other factors may also be considered in identifying a display device.

At block 308, a request from a mobile device to connect to a display device may be received, e.g., via a connection manager 124. The request may include information identifying the mobile device (such as its IP address and device capabilities), an access code associated with the display device to which the mobile device desires to connect, an application identifier identifying a software application on the display device with which the mobile device desires to interact, requirements for the software application, and the various networks to which the mobile device may have access, as non-limiting examples. At block 310, a server, e.g., the control server device 110, may use this information to determine a type of connection for enabling communication between the mobile device and the display device.

At block 314, a determination is made whether a direct connection is desired. A direct connection may be desired if two devices, e.g., a mobile device and a display device, are on the same network, such as a WiFi network or Bluetooth network. Certain software applications, such as real-time gaming applications, may require a direct connection to reduce the amount of latency that may exist in cloud-based communications between mobile devices and display devices. Functions that may be performed in association with a direct connection will be discussed below in association with FIG. 4.

If a direct connection is not required (e.g., a cloud connection or a location-based connection may instead be required), a server may be selected, e.g., via the connection manager 124, for relaying content between the mobile device and the display device, at block 316. For example, a server for relaying content may be selected based on a current load (e.g., number of concurrent users) connected to the server, or on the operational performance of the server (e.g., network reliability, available memory, available disk space, etc.), as non-limiting examples. A connection between the mobile device and display device may be established, and content may be transferred between the devices, e.g., via the relay server device 140, at block 318. In one embodiment, a control server device, e.g., control server device 110, may include a server for relaying content between mobile devices and display devices (e.g., a relay server device such as relay server device 140).

Figure 4:
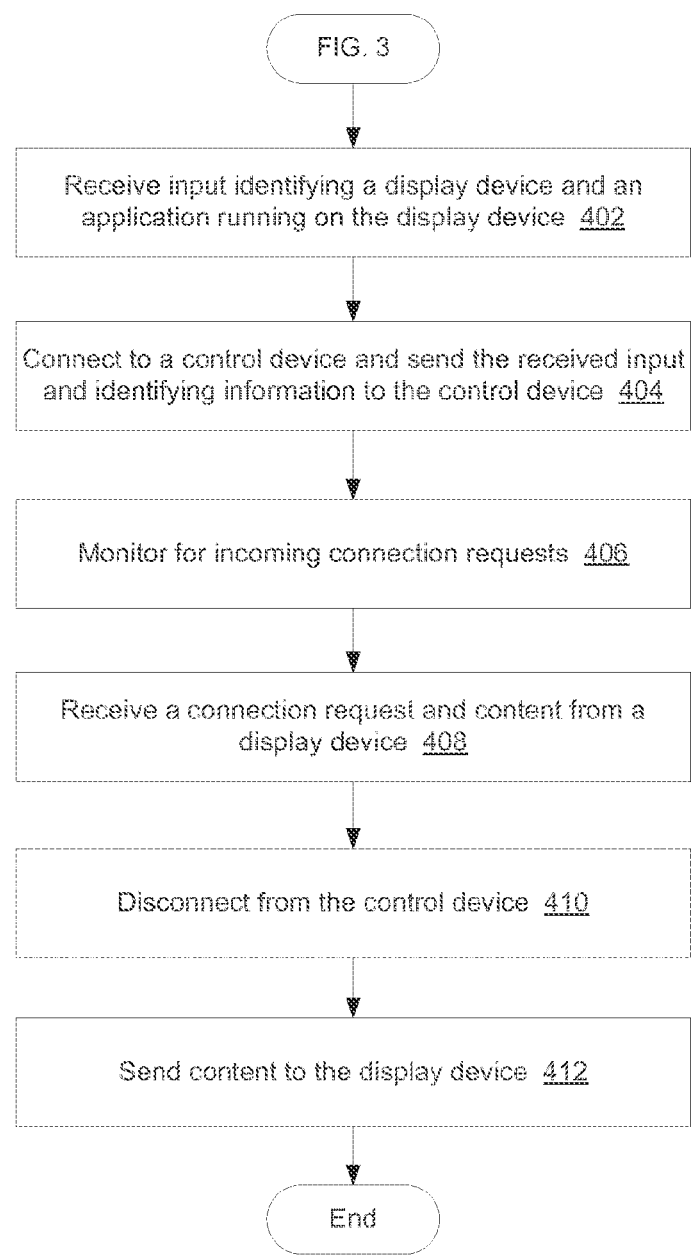
FIG. 4 illustrates an example flow diagram of a mobile device establishing a direct connection with a display device, according to an embodiment of the disclosure.

FIG. 4 illustrates an example flow diagram of a mobile device establishing a direct connection with a display device, according to an embodiment of the disclosure. Processing may begin at block 402, where input identifying a display device and an application running on the display device may be received. Examples of such input may include, but is not limited to, text entered into a mobile device 160 by a user via an I/O device 152 such as a keypad, or voice-activated input spoken into a mobile device 160 by a user via an I/O device 152. In one embodiment, such information may be received via the mobile connection module 164 communicating with the connection manager 124, which may receive the information from display devices identifying themselves as available for communication. A user may enter such information into a mobile device as appropriate to interact with a particular software application on a display device, in one embodiment. At block 404, the input received at the mobile device and information identifying the mobile device (such as the information indicated in block 308 in FIG. 3 above) may be sent to a server, e.g., control server device 110 to, for example, request a connection to a specified software application running on a specified display device.

At block 406, incoming connection requests may be monitored, e.g., via the mobile connection module 164. In one configuration, the mobile connection module 164 may monitor incoming connections to establish a direct connection with a display device, which may use the connection to host communication with the mobile device and other mobile devices after the connection is established. According to this configuration, the display device may be a smart television that may be unable to receive incoming connection requests, and therefore, may be unable to establish a connection with other devices. In such instances, a mobile device may receive incoming connections and establish the connection with the display device, at which point bidirectional communication (incoming and outgoing content from both the mobile device and the display device) may occur. In another example, a server intermediary, such as a control server device 110, may also establish a connection for the display device. In some embodiments, however, the display device may be able to receive incoming connection requests and therefore may establish its own connections with other devices. Thus, a mobile device, relay server device, or a display device may act as a connection host for communication, while the other device may act as a client.

A connection request and content displayed on the connected display device may be received at block 408. A server, e.g., control server device 110, may send instructions to the mobile device and the display device (and any other devices requesting a connection to other devices) regarding pending connections. Once the devices are connected, the devices may communicate with the other devices by sending content to the other devices, for example. If the connection between the mobile device and the display device is a direct connection, the mobile device and the display device may disconnect from the server, at block 410. In embodiments that involve a cloud connection or location-based connection, the mobile device may remain connected to the server intermediary so that the mobile device may continue to communicate, e.g., via communication between the session manager 146 and the session manager module 148. Content may be communicated between connected mobile devices and display devices at block 412.

Each of the operations in FIGS. 3 and 4 may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In addition to the types of connections described above, modifications to these connections may exist in other embodiments. For example, one or more mobile devices may connect to one or more display devices in any combination of the following aspects: via a direct connection where devices may be connected to a single, and possibly the same, network; via an indirect connection where devices may be connected to one or more different networks; via a cloud connection proxied by a control server where devices may be connected to a single, and possibly the same, network; via a cloud connection proxied by a control server where devices may be connected to one or more different networks; or via a cloud connection proxied by a control server where mobile devices may be connected via wireless carrier networks. Various other modifications or types of connections may exist in other embodiments. For example, in some aspects, a cloud connection may be proxied by a control server to connect a single device to a single network.

In some aspects, an additional method may provide for establishing a connection between one or more devices and one or more networks (e.g., any combination of wired and/or wireless networks). By way of example only, there may be between one and one hundred devices attempting to connect to one network. Additionally, there may be a desire for low latency communication and the sending and receiving of messages may occur at substantially the same rate.

Another method may provide for establishing a connection between one or more devices and one or more separate networks. By way of example only, there may be hundreds of devices attempting to connect to separate networks (such as cellular networks), where low latency may be desired but a minimal amount of latency may be acceptable, and the sending and receiving of messages may also occur at the same or similar rates.

A further method may provide for establishing a connection between a large group of devices (e.g., thousands of devices) connected to separate networks (such as cellular networks) where some amount of latency may be expected. By way of example only, the rate of sending and receiving messages may not be expected to occur at the same rate, with the expectation that receiving messages may occur in near real time.

Certain other embodiments may also be related to the present disclosure. For example, the features described herein may be implemented with relation to video games. In this example, a video game can utilize the aforementioned functionality to use a mobile device (e.g., a cell phone or tablet PC) as a game controller, where the game may be displayed and/or rendered on a TV or display device.

In some aspects, the features described herein may also be implemented with relation to public and/or private social events. For example, bars or other physical gatherings may install applications on existing televisions or display devices, and allow their patrons to participate by using their mobile devices to connect and interact with the television or display device that is being viewed by multiple people at the bar or gathering.

Additionally, in some aspects, the features described herein may be implemented with relation to restaurant ordering systems. For example, a fast food chain could use the aforementioned functionality to allow customers to place orders from their mobile devices, and pick up the order when it is ready. A television or other display device at the restaurant could display the sequence of orders and indicate when an order is ready by displaying it on the television or display device. Alerts may also be sent back to customers to alert them when the orders are ready.

Further, in some aspects, the features described herein may be implemented with relation to sports stadium, or arena, applications. For example, a stadium, arena, or other large gathering could allow users to connect and interact with large display devices (e.g., a JumboTron or other display device large enough to be seen by many people at the same place). In this example, filters may be applied to keep users from displaying inappropriate or offensive material. For instance, a filter may be automatic, such as a list of words that will not be displayed, or it may pass all messages through a moderator who screens user comments.

Many modifications and other implementations of the disclosure set forth herein will be apparent having the benefit of the teachings presented in the foregoing descriptions and the associated drawings. Therefore, it is to be understood that the disclosure is not to be limited to the specific implementations or examples disclosed and that modifications and other implementations are intended to be included within the scope of the appended claims. Although specific terms are employed herein, they are used in a generic and descriptive sense only to facilitate description herein and not for purposes of limitation.

What is claimed is:

1. A mobile device comprising:
at least one processor; and
at least one non-transitory memory that stores computer-executable instructions executable on the at least one processor, such that the at least one processor is configured to:
receive, at the mobile device, from a user or a control server device external to the mobile device, third information on a display device, the display device displaying images or a video,
connect to the control server device, wherein the connecting comprises transmitting, by the mobile device, second information identifying the mobile device and the third information to the control server device, the control server device determining a type of connection between the mobile device and the display device based at least in part on at least one of first information identifying the display device, the second information or the third information,
establish the type of connection between the mobile device and the display device according to control of the control server device, and
send, from the mobile device, content to the display device for display on the display device.

2. The mobile device of claim 1, wherein the third information comprises an access code that uniquely identifies the display device.

3. The mobile device of claim 1, wherein the first information and the second information comprise information on one or more accessible networks for the display device and the mobile device.

4. The mobile device of claim 3, wherein, when the mobile device and the display device have access to the same network of the one or more accessible networks, the type of connection established is a direct connection.

5. The mobile device of claim 1, wherein the content is relayed between the mobile device and the display device by a relay server or the control server device.

6. The mobile device of claim 1,
wherein the first information and the second information comprise geographical coordinates for the display device and the mobile device, respectively, and
wherein the type of connection established is a location-based connection.

7. The mobile device of claim 1, wherein at least one of the first information or the second information comprises at least one of connection options or device capabilities for the display device and the mobile device.

8. One or more non-transitory computer-readable media configured to store one or more computer-executable instructions that, when executed by at least one processor of a mobile device, configure the at least one processor to perform operations comprising:
receiving, at the mobile device, a first input identifying the display device and a second input identifying an application running on the display device;
connecting to a control server device external to the mobile device, wherein the connecting comprises sending, from the mobile device to the control server device, information identifying the mobile device;
sending the first input and the second input to the control server device, the control server device determining a type of connection between the mobile device and the display device based at least in part on at least one of the first input and the second input;
receiving, from the display device, a connection request according to control of the control server device;
in response to the receiving of the connection request, establishing the type of connection between the mobile device and the display device according to control of the control server device; and
sending, from the mobile device, content to the display device.

9. The one or more non-transitory computer-readable media of claim 8, wherein the at least one processor is further configured to perform operations comprising sending, from the mobile device, other content to a second mobile device, wherein the display device relays the other content to the second mobile device.

10. The one or more non-transitory computer-readable media of claim 8, wherein the at least one processor is further configured to perform operations comprising monitoring, by the mobile device, for a connection request.

11. The one or more non-transitory computer-readable media of claim 8, wherein the at least one processor is further configured to perform operations comprising establishing a connection with the display device, wherein the connection is based at least in part on one or more requirements associated with the application.

12. A display device for comprising:
at least one processor; and
at least one non-transitory memory that stores computer-executable instructions executable on the at least one processor, such that the at least one processor is configured to:
receive, at the display device, from a control server device external to the display device, third information on the display device, the display device displaying images or a video,
connect to the control server device, wherein the connecting comprises transmitting, by the display device, first information identifying the display device to the control server device, the control server device determining a type of connection between a mobile device and the display device based at least in part on at least one of the first information, second information identifying the mobile device or the third information,
establish the type of connection between the mobile device and the display device according to control of the control server device, and
receive content, from the mobile device, for display on the display device.

13. The display device of claim 12, wherein the third information comprises an access code that uniquely identifies the display device.

14. The display device of claim 12, wherein the first information and the second information comprise information on one or more accessible networks for the display device and the mobile device.

15. The display device of claim 14, wherein, when the mobile device and the display device have access to the same network of the one or more accessible networks, the type of connection established is a direct connection.

16. The display device of claim 12, wherein the content is relayed between the mobile device and the display device by a relay server or the control server device.

17. The display device of claim 12,
wherein the first information and the second information comprise geographical coordinates for the display device and the mobile device, respectively, and wherein the type of connection established is a location-based connection.

18. The display device of claim 12, wherein at least one of the first information or the second information comprises at least one of connection options or device capabilities for the display device and the mobile device.

* * * * *